United States Patent
Kurokawa et al.

(10) Patent No.: US 7,470,747 B2
(45) Date of Patent: Dec. 30, 2008

(54) BLOCK COPOLYMER MIXTURE AND HEAT SHRINKABLE FILM USING IT

(75) Inventors: Yoshinari Kurokawa, Ichihara (JP); Hideki Toya, Ichihara (JP); Eiji Sato, Ichihara (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 306 days.

(21) Appl. No.: 11/356,977

(22) Filed: Feb. 21, 2006

(65) Prior Publication Data
US 2007/0196604 A1 Aug. 23, 2007

(51) Int. Cl.
C08L 53/02 (2006.01)
B32B 27/28 (2006.01)
B65B 53/00 (2006.01)
C08F 297/00 (2006.01)

(52) U.S. Cl. .................. 525/89; 525/314; 428/34.9; 428/35.1; 428/220; 428/521

(58) Field of Classification Search .................. 525/89, 525/314; 428/34.9, 35.1, 35.7, 220, 521
See application file for complete search history.

(56) References Cited

U.S. PATENT DOCUMENTS 6,369,160 B1 * 4/2002 Knoll et al. .................. 525/89

7,189,462 B2 * 3/2007 Matsui et al. ............... 428/517

FOREIGN PATENT DOCUMENTS

JP 7-268175 10/1995

* cited by examiner

*Primary Examiner*—Fred M Teskin
(74) *Attorney, Agent, or Firm*—Oblon, Spivak, McClelland, Maier & Neustadt, P.C.

(57) ABSTRACT

A block copolymer mixture comprising block copolymers (A), (B) and (C) each block comprising vinyl aromatic hydrocarbon and conjugated diene monomer units:

wherein block (A) comprises from 75 to 95 mass % of a vinyl aromatic hydrocarbon and from 5 to 25 mass % of a conjugated diene, and which has a block portion composed mainly of a vinyl aromatic hydrocarbon having a number average molecular weight of from 30,000 to less than 150,000:

block (B) comprises from 50 to 80 mass % of a vinyl aromatic hydrocarbon and from 20 to 50 mass % of a conjugated diene, and which has a block portion composed mainly of a vinyl aromatic hydrocarbon having a number average molecular weight of from 20,000 to less than 120,000, and block (C) comprises from 60 to 95 mass % of a vinyl aromatic hydrocarbon and from 5 to 40 mass % of a conjugated diene, which has at least one random copolymer block portion comprising, as monomer units, from 55 to 95 mass % of a vinyl aromatic hydrocarbon and from 5 to 45 mass % of a conjugated diene.

25 Claims, No Drawings

BLOCK COPOLYMER MIXTURE AND HEAT SHRINKABLE FILM USING IT

BACKGROUND OF THE INVENTION

The present invention relates to block copolymers each made of a vinyl aromatic hydrocarbon and a conjugated diene, a mixture comprising them, a sheet or film using such a mixture, and a bottle using such a film.

DISCUSSION OF BACKGROUND

A block copolymer resin comprising a vinyl aromatic hydrocarbon and a conjugated diene is widely known as a resin excellent in impact strength and transparency, and a heat shrinkable film obtainable by processing it into a sheet or film, followed by stretching under a certain specific condition, is suitable for use as a packaging material. However, such a block copolymer has a drawback that the rigidity is low, and for the purpose of overcoming such a drawback, it has been attempted to incorporate a transparent styrene type polymer (JP-A-7-268175). By the incorporation, the rigidity became high, but there was a drawback such that the fracture resistance or shrinkability tended to be low, and the transparency sometimes deteriorated.

SUMMARY OF THE INVENTION

It is the object of the present invention to provide a heat shrinkable film and a heat shrinkable multilayer film, which are excellent in the balance of transparency, fracture resistance, rigidity and heat shrinkability.

The present inventors have conducted an extensive study to solve the above problems and as a result, have found it possible to obtain a heat shrinkable film excellent in the balance of transparency, fracture resistance, rigidity and heat shrinkability, by employing a block copolymer mixture having three types of block copolymers each comprising an aromatic hydrocarbon and a conjugated diene, different respectively in the molecular structure, blended in specific amounts, preferably a resin mixture comprising such a block copolymer mixture and a styrene resin. The present invention has been accomplished on the basis of such a discovery.

Namely, the present invention provides the following:
(1) A block copolymer mixture comprising the following bock copolymers (A), (B) and (C) each made of a vinyl aromatic hydrocarbon and a conjugated diene as constituting components, wherein (A) is from 20 to 60 mass %, (B) is from 20 to 70 mass % and (C) is from 5 to 50 mass %:
  (A) A block copolymer which comprises, as monomer units, from 75 to 95 mass % of a vinyl aromatic hydrocarbon and from 5 to 25 mass % of a conjugated-diene, which has, at least at one terminal, a block portion composed mainly of a vinyl aromatic hydrocarbon having a number average molecular weight of from 30,000 to less than 150,000, and which has an entire number average molecular weight of from 100,000 to less than 300,000;
  (B) A block copolymer which comprises, as monomer units, from 50 to 80 mass % of a vinyl aromatic hydrocarbon and from 20 to 50 mass % of a conjugated diene, which has, at least at one terminal, a block portion composed mainly of a vinyl aromatic hydrocarbon having a number average molecular weight of from 20,000 to less than 120,000, which has from 10 to 70 mass % of at least one random copolymer block portion comprising, as monomer is units, from 55 to 95 mass % of a vinyl aromatic hydrocarbon and from 5 to 45 mass % of a conjugated diene and further has from 15 to 45 mass % of at least one random copolymer block portion comprising, as monomer units, from 0 to 55 mass % (provided 55 mass % is excluded) of a vinyl aromatic hydrocarbon and from 45 to 100 mass % (provided 45 mass % is excluded) of a conjugated diene, and which has an entire number average molecular weight of from 50,000 to less than 200,000;
  (C) A block copolymer which comprises, as monomer units, from 60 to 95 mass % of a vinyl aromatic hydrocarbon and from 5 to 40 mass % of a conjugated diene, which has at least one random copolymer block portion comprising, as monomer units, from 55 to 95 mass % of a vinyl aromatic hydrocarbon and from 5 to 45 mass % of a conjugated diene, and which has an entire number average molecular weight of from 200,000 to less than 300,000.
(2) The block copolymer mixture according to the above (1), wherein the melt mass flow rate is from 2 to 30 g/10 min.
(3) A resin composition comprising 100 parts by mass of the block copolymer mixture as defined in the above (1) or (2) and from 5 to 100 parts by mass of a styrene resin.
(4) A sheet using the resin composition as defined in the above (3).
(5) A film using the resin composition as defined in the above (3).
(6) A heat shrinkable film using the resin composition as defined in the above (3).
(7) A heat shrinkable multilayer film having at least one heat shrinkable film layer using the resin composition as defined in the above (3).
(8) A bottle provided with the heat shrinkable film as defined in the above (6).
(9) A bottle provided with the heat shrinkable multilayer film as defined in the above (7).

By using the resin composition obtainable by the present invention, a film excellent in the balance of transparency, fracture resistance, rigidity and heat shrinkability, can be obtained.

DETAILED DESCRIPTION OF THE PREFERRED EMBODIMENTS (A) is a block copolymer comprising from 75 to 95 mass % of a vinyl aromatic hydrocarbon as a monomer unit and from 5 to 25 mass % of a conjugated diene as a monomer unit, preferably from 80 to 90 mass % of a vinyl aromatic hydrocarbon as a monomer unit and from 10 to 20 mass % of a conjugated diene as a monomer unit. If the vinyl aromatic hydrocarbon is more than 95 mass % as a monomer unit or if the vinyl aromatic hydrocarbon is less than 75 mass % as a monomer unit, a sheet or film excellent in the balance of transparency, fracture resistance, rigidity and heat shrinkability, may not be obtained.

(A) has a block portion composed mainly of a vinyl aromatic hydrocarbon having a number average molecular weight of from 30,000 to less than 150,000 at least at one terminal. It is further preferred that the number average molecular weight of the block portion is from 50,000 to less than 100,000.

If the block portion composed mainly of a vinyl aromatic hydrocarbon is not present at any terminal, or even if it has a block portion composed mainly of a vinyl aromatic hydrocarbon at one terminal, if its number average molecular weight is less than 30,000, the transparency of the sheet or film may sometimes be low. Further, if the number average molecular weight exceeds 150,000, the processability of the resin composition may deteriorate.

(A) has an entire number average molecular weight of from 100,000 to less than 300,000, preferably from 120,000 to less than 240,000. If the entire number average molecular weight is less than 100,000, the transparency of the sheet or film may sometimes be low. Further, if the entire number average molecular weight exceeds 300,000, processability of the resin composition may deteriorate.

The block ratio of (A) is not particularly limited, but it is usually preferably from 70 to 99%. Here, the block ratio is one obtained as follows.

Block ratio=(The amount of the vinyl aromatic hydrocarbon present as block homopolymerized segments in the copolymer)/(the amount of the vinyl aromatic hydrocarbon contained in the copolymer)×100

Further, the amount of the vinyl aromatic hydrocarbon present as block homopolymerized segments in the block copolymer is obtained in such a manner that the block copolymer is oxidized and decomposed by tert-butyl hydroperoxide by using osmic acid in a catalytic amount in accordance with the osmic acid decomposition method disclosed by L. M. Kolthoff, et. al., J. Polym. Sci., 1,429 (1948), and then poured into a large amount of methanol to precipitate a vinyl aromatic hydrocarbon polymer, which is vacuum-dried, and the mass of the solid content of the vinyl aromatic hydrocarbon polymer is measured.

Further, the molecular structure of (A) is preferably straight-chained.

(B) comprises, as monomer units, from 50 to 80 mass % of a vinyl aromatic hydrocarbon and from 20 to 50 mass % of a conjugated diene and has, at least at one terminal, a block portion composed mainly of a vinyl aromatic hydrocarbon having a number average molecular weight of from 20,000 to less than 120,000. Further, it is a block copolymer which has from 10 to 70 mass % of at least one random copolymer block portion comprising, as monomer units, from 55 to 95 mass % of a vinyl aromatic hydrocarbon and from 5 to 45 mass % of a conjugated diene and further has from 15 to 45 mass % of at least one random copolymer block portion comprising, as monomer units, from 0 to 55 mass % (provided that 55 mass % is excluded) of a vinyl aromatic hydrocarbon and from 45 to 100 mass % (provided 45 mass % is excluded) of a conjugated diene, and which has an entire number average molecular weight of from 50,000 to less than 200,000.

(B) is a block copolymer comprising from 50 to 75 mass % of a vinyl aromatic hydrocarbon as a monomer unit and from 25 to 50 mass % of a conjugated diene as a monomer unit, preferably from 55 to 75 mass % of a vinyl aromatic hydrocarbon as a monomer unit and from 25 to 45 mass % of a conjugated diene as a monomer unit.

If the vinyl aromatic hydrocarbon is more than 75 mass % as a monomer unit, the balance of rigidity and fracture resistance of a sheet or film tends to be poor, and if the vinyl aromatic hydrocarbon is less than 50 mass %, a decrease in the rigidity of the sheet or film may sometimes be large.

(B) has, at least at one terminal, a block portion composed mainly of a vinyl aromatic hydrocarbon having a number average molecular weight of at least 20,000 and less than 120,000. It is further preferred that the number average molecular weight of the block portion is from 30,000 to less than 80,000.

In a case where no block portion composed mainly of a vinyl aromatic hydrocarbon is present at any terminal, or even if it has a block portion composed of a vinyl aromatic hydrocarbon at one terminal, if its number average molecular weight is less than 20,000, the transparency of the sheet or film may sometimes be low. Further, if its number average molecular weight exceeds 120,000, the processability of the resin composition may sometimes deteriorate.

(B) has an entire number average molecular weight of from 50,000 to less than 200,000, preferably from 100,000 to less than 180,000. If the entire number average molecular weight is less than 50,000, the transparency of the sheet or film may sometimes be low. Further, if the entire number average molecular weight exceeds 200,000, the processability of the resin composition may sometimes deteriorate.

The block copolymer (B) has from 10 to 70 mass % of at least one random copolymer block portion comprising, as monomer units, from 55 to 95 mass % of a vinyl aromatic hydrocarbon and from 5 to 45 mass % of a conjugated diene. If the vinyl aromatic hydrocarbon of this random copolymer block portion is more than 95 mass % as a monomer unit, the shrinkability of the sheet or film may sometimes be low, and if the vinyl aromatic hydrocarbon is less than 55 mass % as a monomer unit, the rigidity of the sheet of film may sometimes deteriorate. Further, if this random copolymer block portion is less than 10 mass %, the shrinkability of the sheet or film may sometimes be low, and if it exceeds 70 mass %, the balance of rigidity and rupture resistance of the sheet or film may sometimes deteriorate.

The block copolymer (B) has from 15 to 45 mass % of at least one random copolymer block portion comprising, as monomer units, from 0 to 55 mass % (provided 55 mass % is excluded) of a vinyl aromatic hydrocarbon and from 45 to 100 mass % (provided 45 mass % is excluded) of a conjugated diene. If the vinyl aromatic hydrocarbon in this random copolymer block portion exceeds 55 mass % as a monomer unit, the balance of rigidity and rupture resistance of the sheet or film may sometimes deteriorate. Further, if this random copolymer block portion is less than 15 mass %, the balance of rigidity and rupture resistance of the sheet or film may sometimes deteriorate, and if it exceeds 45 mass %, a decrease in the rigidity of the sheet or film may sometimes be large.

Further, the molecular structure of (B) is preferably straight-chained.

(C) is a block copolymer comprising from 60 to 95 mass % of a vinyl aromatic hydrocarbon as a monomer unit and from 5 to 40 mass % of a conjugated diene as a monomer unit, and preferably, the monomer unit of a vinyl aromatic hydrocarbon is from 75 to 95 mass %, and the monomer unit of a conjugated diene is from 5 to 25 mass %. If the vinyl aromatic hydrocarbon exceeds 95 mass % as a monomer unit, the shrinkability of the sheet or film may sometimes deteriorate. On the other hand, if the vinyl aromatic hydrocarbon is less than 60 mass % as a monomer unit, the rigidity of the sheet or film may sometimes deteriorate.

(C) has an entire number average molecular weight of from 200,000 to less than 300,000, preferably from 220,000 to less than 280,000. If the entire number average molecular weight is less than 200,000, the transparency of the sheet or film may sometimes deteriorate. On the other hand, if the entire number average molecular weight is 300,000 or more, the processability of the resin composition may sometimes deteriorate.

Further, the molecular structure of (C) is preferably straight-chained.

In the block copolymer mixture comprising the block copolymers (A), (B) and (C), (A) is from 20 to 60 mass %, preferably from 25 to 50 mass %, further preferably from 30 to 50 mass %, (B) is from 20 to 70 mass %, preferably from 25 to 60 mass %, further preferably from 30 to 55 mass %, and (C) is from 5 to 50 mass %, preferably from 10 to 40 mass %, further preferably from 15 to 35 mass %. If (A) is less than 20 mass %, the transparency of the sheet or film may sometimes deteriorate. If (A) exceeds 60 mass % or if (B) is less than 20 mass %, the fracture resistance of the sheet or film may sometimes deteriorate. If (B) exceeds 70 mass %, the transparency and rigidity of the sheet or film may sometimes deteriorate. If (C) is less than 5 mass %, the heat shrinkability of the sheet or film tends to be inadequate, and if it exceeds 50 mass %, the fracture resistance may sometimes deteriorate.

The vinyl aromatic hydrocarbon to be used for (A), (B) and (C) may, for example, be styrene, o-methylstyrene, p-methylstyrene, p-tert-butylstyrene, 1,3-dimethylstyrene, α-methylstyrene, vinylnaphthalene or vinylanthracene, particularly preferably styrene. One of them may be used or two or more of them may be used.

The conjugated diene to be used for (A), (B) and (C) may be a $C_{4-8}$ diolefin having a pair of conjugated double bonds, such as 1,3-butadiene, 2-methyl-1,3-butadiene (isoprene), 2,3-dimethyl-1,3-butadiene, 1,3-pentadiene or 1,3-hexadiene. Particularly preferred is 1,3-butadiene or isoprene. One of them may be used, or two or more of them may be used.

(A), (B) and (C) may be obtained by common living anion polymerization employing an organic lithium compound as a polymerization initiator in an organic solvent. The organic solvent to be used for such production is a low molecular weight organic compound comprising carbon and hydrogen, and for example, a known organic solvent may be employed such as an aliphatic hydrocarbon such as butane, pentane, hexane, isopentane, heptane, octane or isooctane; an alicyclic hydrocarbon such as cyclopentane, methylcyclopentane, cyclohexane, methylcyclohexane or ethylcyclohexane; or an aromatic hydrocarbon such as benzene, toluene, ethylbenzene or xylene.

Further, the organic lithium compound is a compound having at least one lithium atom bonded in its molecule and may, for example, be ethyllithium, n-propyllithium, isopropyllithium, n-butyllithium, sec-butyllithium or tert-butyllithium.

For the production of a block copolymer, a small amount of a polar compound may be dissolved in the solvent. Such a polar compound may be used to improve the efficiency of the initiator. It may, for example, be an ether such as tetrahydrofuran, diethylene glycol dimethyl ether or diethylene glycol dibutyl ether; an amine such as triethylamine or tetramethylethylenediamine; a thioether; a phosphine; a phosphoramide; an alkylbenzenesulfonate; or an alkoxide of potassium or sodium. Among them, a preferred polar compound is tetrahydrofuran.

The polymerization temperature for the production of a block copolymer is usually from −10 to 150° C., preferably from 40 to 120° C. The time required for the polymerization varies depending upon the conditions, but is usually within 48 hours, preferably from 0.5 to 10 hours. Further, it is preferred that the interior of the polymerization apparatus is preliminarily substituted with an inert gas such as nitrogen gas. The polymerization pressure is not particularly limited, so long as the polymerization can be carried out within a sufficient pressure range to maintain the monomers and the solvent in a liquid phase within the above-mentioned polymerization temperature range. Further, it is necessary to take care so that impurities to deactivate the living polymer, such as water, oxygen, carbon dioxide gas, etc., will not enter into the interior of the polymerization apparatus.

After completion of the polymerization, water, an alcohol, carbon dioxide, an organic acid or an inorganic acid may, for example, be added in an amount sufficient to deactivate living active terminals for deactivation.

In order to obtain a block copolymer mixture comprising (A), (B) and (C), the polymerization solutions deactivated after completion of the polymerization of the respective block copolymers, may be mixed and then the solvents may be removed, or the resins obtained by removing the solvents from the respective polymerization solutions, may be blended and then melt-kneaded by an extruder.

To the obtained block copolymer mixture, various additives may be incorporated, as the case requires. They are, for example, a stabilizer, a lubricant, a processing adjuvant, an anti-blocking agent, an antistatic agent, an anti-fogging agent, a weather-resistance improving agent, a softening agent, a plasticizer and a pigment. Such additives may otherwise be added at the time of producing a resin composition by blending the block copolymer mixture with a styrene resin.

The stabilizer may, for example, be a phenol type antioxidant such as 2-[1-(2-hydroxy-3,5-di-tert-pentylphenyl) ethyl]-4,6-di-tert-pentylphenyl acrylate, 2-tert-butyl-6-(3-tert-butyl-2-hydroxy-5-methylbenzyl)-4-methylphenyl acrylate, octadecyl-3-(3,5-di-tert-butyl-4-hydroxyphenyl) propionate or 2,6-di-tert-butyl-4-methylphenol, or a phosphorus type antioxidant such as 2,2-methylenebis(4,6-di-tert-butylphenyl) octyl phosphite, trisnonylphenyl phosphite or bis(2,6-di-tert-butyl-4-methylphenyl)pentaerythritol diphosphite.

As the lubricant, processing adjuvant, anti-blocking agent, antistatic agent or anti-fogging agent, for example, a saturated fatty acid such as palmitic acid, stearic acid or behenic acid; a fatty acid ester such as octyl palmitate, octyl stearate or a pentaerythritol fatty acid ester; a fatty acid amide such as erucic acid amide, oleic acid amide, stearic acid amide or ethylenebisstearic acid amide; a sorbitan fatty acid ester such as a glycerol-mono-fatty acid ester, a glycerol-di-fatty acid ester, a sorbitan-mono-palmitic acid ester, or a sorbitan-mono-stearic acid ester; or a higher alcohol such as myristyl alcohol, cetyl alcohol or stearyl alcohol, may be used.

As the weather resistance-improving agent, an ultraviolet absorber such as 2-(2'-hydroxy-3'-tert-butyl-5'-methylphenyl)-5-chlorobenzotriazole, 2,4-di-tert-butylphenyl-3',5'-di-tert-butyl-4'-hydroxy benzoate or 2-hydroxy-4-n-octoxybenzophenone, or a hindered amine type weather resistance-improving agent such as tetrakis(2,2,6,6-tetramethyl-4-piperidyl)-1,2,3,4-butanetetracarboxylate, may, for example, be used. Further, as other additives, white oil, silicone oil, etc. may also be added.

Such additives are used preferably in an amount of from 0 to 5 mass % in the block copolymer mixture. If they exceed 5 mass %, the additives may bleed out on the surface of the sheet or film, whereby the outer appearance may be impaired.

The melt mass flow rate of the block copolymer mixture thus obtained, is not particularly limited, but is preferably from 2 to 30 g/10 min, from the viewpoint of molding processability. It is more preferably from 5 to 20 g/10 min, further preferably from 5 to 15 g/10 min.

Here, the measurement was carried out in accordance with ISO 1133 under a test condition of 200° C. with a load of 49 N.

The styrene resin to be incorporated to the block copolymer mixture is a polymer having a vinyl aromatic hydrocarbon in its molecule, and it may, for example, be a polystyrene, a styrene/α-methylstyrene copolymer, an acrylonitrile/styrene copolymer, a styrene/acrylate copolymer, a styrene/methacrylate copolymer, a styrene/maleic anhydride copolymer or a styrene/butadiene copolymer. Particularly preferred is a polystyrene, a styrene/acrylate copolymer or a styrene/butadiene copolymer.

In a case where the composition is to be used for a heat shrinkable film or a heat shrinkable multilayer film, it is preferred to incorporate from 5 to 100 parts by mass of a styrene resin per 100 parts by mass of the block copolymer mixture in order to improve the rigidity. The styrene resin is more preferably from 10 to 80 parts by mass, further preferably from 20 to 60 parts by mass, per 100 parts by mass of the block copolymer mixture.

A known method may be employed as a method for producing the heat shrinkable film or heat shrinkable multilayer film. For example, the heat shrinkable film may be obtained by forming the resin composition into a sheet or film by a T-die method or a circular die method and stretching it in a monoaxial direction or in biaxial directions. The heat shrinkable multilayer film may be obtained by forming a sheet or film by a T-die or circular die having a feed block or multi manifold so that the resin composition constitutes at least one layer and stretching it in a monoaxial direction or biaxial directions. As a layer other than the resin composition, it is preferred to employ a styrene resin. Further, the block copolymer mixture may be used alone for sheeting and stretching.

To obtain good shrinkability, the stretching temperature is preferably from 60 to 120° C., and the stretching rate is preferably from 1.5 to 8 times. Further, the thickness of the film is preferably from 10 to 300 μm.

The obtained heat shrinkable film or heat shrinkable multilayer film is applied to a bottle in the form of a label having a design, letters, a trademark, etc. printed thereon by a conventional method, and then, the label is subjected to heat shrinkage and fixed on the bottle by a conventional method. The heating method may be steam heating or hot air heating, and the heating temperature is preferably adjusted so that the label surface would be from 70 to 90° C.

The heat shrinkable film or heat shrinkable multilayer film of the present invention can be used not only as a heat shrinkable label for a bottle, but also as e.g. a heat shrinkable cap seal for a bottle, a protective film for a bottle or other packaging films.

EXAMPLES

Now, the present invention will be described in further detail with reference to Examples. However, it should be understood that the present invention is by no means restricted to such specific Examples. Further, also in the production of the block copolymers (B) and (C) in the following Examples, it is, of course, possible to use a polar compound such as tetrahydrofuran in combination, in the same manner as in the case for the block copolymer (A).

Reference Example 1

Production of (A)

A stainless steel polymerization tank having an internal capacity of 150 L and equipped with a jacket and a stirrer, washed with cyclohexane and flushed with nitrogen. Then, in a nitrogen gas atmosphere, 61.65 kg of cyclohexane dehydrated to a moisture content of at most 6 ppm and containing 150 ppm of tetrahydrofuran, was charged into the polymerization tank. Then, 5.95 kg of styrene dehydrated to a moisture content of 5 ppm was added. After raising the internal temperature to 50° C., 75 ml of a solution containing 10 mass % of n-butyllithium in cyclohexane was added, followed by polymerization for 20 minutes within a range where the maximum temperature did not exceed 120° C. (first stage polymerization).

Further, after raising the internal temperature to 80° C., 9.4 kg of styrene dehydrated to a moisture content of at most 5 ppm and 4.1 kg of butadiene dehydrated by passing it through a molecular sieve, were simultaneously added, followed by polymerization for 20 minutes within a range where the maximum temperature did not exceed 120° C. (second stage polymerization).

Then, after the heat generation ceased, 1.1 kg of styrene dehydrated to a moisture content of at most 5 ppm was added under a condition where the internal temperature was constant at 80° C., followed by polymerization for 20 minutes within a range where the maximum temperature did not exceed 120° C. (third stage polymerization).

After deactivating a living polymer by adding water to the solution after completion of the polymerization, cyclohexane was further added for dilution, and the diluted solution was poured into a large amount of methanol to have the polymer content precipitated. The polymer content was separated and vacuum-dried to obtain (A) as a powdery block copolymer. This is designated as (a-1). With respect to the number average molecular weight of the polystyrene block portion, this polymer was subjected to ozone decomposition, and the polystyrene component thereby obtained was subjected to a GPC measurement (as a detector, an ultraviolet spectrometric detector having the wavelength set at 254 nm was used), and the molecular weights corresponding to the respective peaks were obtained from a calibration curve prepared by using a standard polystyrene and styrene oligomer. When the obtained two polystyrene blocks were designated as $A_1$ and $A_2$, their number average molecular weights were 55,000 and 10,000, respectively. Further, the entire number average molecular weight measured by GPC was 190,000.

By using the same method as described above, block copolymers (a-2) to (a-7) as identified in Table 1 were obtained by controlling the amounts of styrene, butadiene and tetrahydrofuran. Further, the molecular weights of the terminal polystyrene blocks were controlled by the amount of the solution containing 10 mass % of n-butyllithium in cyclohexane. Further, in Table 1, B represents a copolymer block of styrene and butadiene, and the styrene/butadiene ratio in B is shown in the Table.

Reference Example 2

Production of (B)

The same polymerization tank as used in Reference Example 1 washed with cyclohexane and flushed with nitrogen. Then, in a nitrogen gas atmosphere, 49 kg of cyclohexane dehydrated to a moisture content of at most 6 ppm and 5.67 kg of styrene dehydrated to a moisture content of at most 5 ppm, were charged and maintained at 30° C. 152 ml of a solution containing 10 mass % of n-butyllithium in cyclohexane was added thereto, followed by polymerization. After styrene was completely consumed, the internal temperature of the reaction system was raised to 80° C., and while the temperature was maintained, 3.99 kg in a total amount of styrene dehydrated to a moisture content of at most 5 ppm and 1.26 kg in a total amount of butadiene dehydrated by passing it through a molecular sieve were simultaneously added at constant rates of 2.6 kg/hr and 0.82 kg/hr, respectively, and after completion of the addition, the system was maintained as it was for 5 minutes. After butadiene gas was completely consumed, while the internal temperature of the reaction system was maintained at 75° C., 7.35 kg of butadiene was added all at once and then reacted. Further, 2.73 kg of styrene dehydrated to a moisture content of at most 5 ppm was added all at once and polymerized.

After completion of the polymerization, the solution was treated in the same manner as in Reference Example 1 to obtain (B) as a powdery block copolymer. This was designated as (b-1).

By using the same method as described above, block copolymers (b-2) to (b-6) as identified in Table 2 were obtained by controlling the amounts of styrene and butadiene.

Reference Example 3

Production of (C)

The same polymerization tank as used in Reference Example 1 washed with cyclohexane and flushed with nitrogen. Then, in a nitrogen gas atmosphere, 48 kg of cyclohexane dehydrated to a moisture content of at most 6 ppm and 0.40 kg of styrene dehydrated to a moisture content of at most 5 ppm, were charged and maintained at 30° C. Then, 155 ml of a solution containing 10 mass % of n-butyllithium in cyclohexane was added thereto, followed by polymerization. After styrene was completely consumed, the internal temperature of the reaction system was raised to 80° C., and while the temperature was maintained, 16.90 kg in a total amount of styrene dehydrated to a moisture content of at most 5 ppm and 2.90 kg in a total amount of butadiene dehydrated by passing it through a molecular sieve, were simultaneously added at constant rates of 11.1 kg/hr and 1.9 kg/hr, respectively, and after completion of the addition, the system was maintained for 5 minutes as it was. Further, 0.40 kg of styrene dehydrated to a moisture content of at most 5 ppm was added all at once and polymerized.

After completion of the polymerization, the solution was treated in the same manner as in Reference Example 1 to obtain (C) as a powdery block copolymer. This was designated as (c-1).

Further, the proportions of styrene and butadiene in the random block portion were obtained by calculation from the monomers at the time of charging and were 85 mass % and 15 mass %, respectively. These results are shown in Table 3. By using the same method as described above, the amounts of styrene and butadiene were controlled to obtain a block copolymer (c-2) as identified in Table 3.

Examples 1 to 4

The block copolymers were charged and blended in a 20 liter Henschel mixer in a blend ratio as shown in Table 4 so that the total amount would be 10 kg, and then extruded by a 40 mmΦ extruder (single Dulmage screw, manufactured by Tabata K.K.) at a temperature of 200° C. to obtain pellets of a block copolymer mixture.

By using the pellets, the melt mass flow rate was measured in accordance with ISO 1133 under a test condition of 200° C. with a load of 49 N.

Then, 8 kg of this block copolymer mixture and 2 kg of commercially available GPPS (G200C, manufactured by Toyo-Styrene Co., Ltd.) were charged and blended in a 20 liter Henschel mixer and then extruded by a 40 mmΦ extruder (a single Dulmage screw, manufactured by Tabata K.K.) at a temperature of 200° C. to obtain pellets of a resin composition. By using 8 kg of this resin composition, a sheet having a thickness of 0.3 mm was formed by extrusion and transversely monoaxially stretched 4.5 times at a stretching temperature of 88° C. by means of a biaxial stretching apparatus (manufactured by Toyo Seiki Seisaku-sho, Ltd.) to obtain a heat shrinkable film (thickness: about 65 μm), and evaluation of the properties was carried out. The results are shown in Table 4.

Measurements of the physical properties of the heat shrinkable films in Table 4, were carried out by the following methods. Further, the tensile elongation at break represents the fracture resistance of the heat shrinkable film. Likewise, the tensile modulus of elasticity represents the rigidity; the heat shrinkage represents the heat shrinkability; and the haze represents the transparency.

(1) Tensile elongation at break and tensile modulus of elasticity: Measured in accordance with JIS K6871 and by means of Tensilon universal testing machine (RTC-1210A) manufactured by A & D Co., Ltd.
(2) Heat shrinkage: A sample was immersed in a boiling water at 100° C. for 10 seconds, and the heat shrinkage was calculated by the following formula.

Heat shrinkage (%)={($L1-L2$)/$L1$}×100 wherein L1: length (in the stretching direction) before immersion, L2: length (in the stretching direction) after shrinkage by immersing it in boiling water at 100° C. for 10 seconds.
(3) Haze: A film was cut out into a size of 50 mm×50 mm, and the haze was measured by means of a haze meter of NDH2000 (manufactured by Nippon Denshoku Co., Ltd.) (in accordance with JIS K7136).

Comparative Examples 1 to 12

Block copolymer mixtures and resin compositions were obtained in the same manner as in Examples in the blend ratios as identified in Table 5, and evaluation of the physical properties were carried out. The results are shown in Table 5.

TABLE 1

| | | Reference Example 1 (block copolymer (A)) | | | | | |
|---|---|---|---|---|---|---|---|
| Items | Unit | a-1 | a-2 | a-3 | a-4 | a-5 | a-6 |
| Amount of styrene | mass % | 80 | 85 | 80 | 65 | 97 | 80 |
| Amount of butadiene | mass % | 20 | 15 | 20 | 35 | 3 | 20 |
| Structure of block copolymer | | A1-B-A2 | A1-B-A2 | A1-B-A2 | A1-B-A2 | A1-B-A2 | A1-B-A2 |
| Molecular weight of A1 | | 55,000 | 9,000 | 22,000 | 40,000 | 53,000 | 160,000 |
| Molecular weight of A2 | | 10,000 | 87,000 | 8,000 | 10,000 | 9,000 | 10,000 |

TABLE 1-continued

| Items | Unit | Reference Example 1 (block copolymer (A)) | | | | | |
|---|---|---|---|---|---|---|---|
| | | a-1 | a-2 | a-3 | a-4 | a-5 | a-6 |
| Entire molecular weight | | 190,000 | 190,000 | 110,000 | 180,000 | 150,000 | 380,000 |
| Styrene/butadiene ratio in B | | 70/30 | 71/29 | 73/27 | 52/48 | 95/5 | 64/36 |

TABLE 2

| Items | Unit | Reference Example 2 (block copolymer (B)) | | | | | |
|---|---|---|---|---|---|---|---|
| | | b-1 | b-2 | b-3 | b-4 | b-5 | b-6 |
| Amount of styrene | mass% | 59 | 60 | 84 | 56 | 60 | 45 |
| Amount of butadiene | mass% | 41 | 40 | 16 | 44 | 40 | 55 |
| Structure of block copolymer | | A1-R1-R2-A2 | A1-R1-R2-A2 | A1-R1-R2-A2 | A1-R1-R2-A2 | A1-R1-R2-A2 | A1-R1-R2-A2 |
| Molecular weight of A1 | | 41,000 | 37,000 | 39,000 | 6,000 | 128,000 | 42,000 |
| Molecular weight of A2 | | 20,000 | 19,000 | 26,000 | 6,000 | 16,000 | 21,000 |
| Entire molecular weight | | 152,000 | 148,000 | 144,000 | 150,000 | 320,000 | 150,000 |
| Amount of R1 | mass % | 25 | 23 | 52 | 64 | 40 | 4 |
| Styrene/butadiene ratio in R1 | | 76/24 | 70/30 | 75/25 | 75/25 | 75/25 | 75/25 |
| Amount of R2 | mass % | 35 | 39 | 3 | 28 | 35 | 54 |
| Styrene/butadiene ratio in R2 | | 0/100 | 15/85 | 0/100 | 0/100 | 0/100 | 0/100 |

TABLE 3

| Items | Unit | Reference Example 3 (block copolymer (C)) | |
|---|---|---|---|
| | | c-1 | c-2 |
| Amount of styrene | mass % | 86 | 50 |
| Amount of butadiene | mass % | 14 | 50 |
| Structure of block copolymer | | A1-R-A2 | A1-R-A2 |
| Entire molecular weight | | 252,000 | 254,000 |
| Amount of styrene in random copolymer block | mass % | 85 | 48 |
| Amount of butadiene in random copolymer block | mass % | 15 | 52 |

TABLE 4

| Items | | | Unit | Example 1 | Example 2 | Example 3 | Example 4 | Example 5 |
|---|---|---|---|---|---|---|---|---|
| Blend formulation of block copolymer mixture | | a-1 | mass % | 45 | 35 | | 45 | |
| | | a-2 | mass % | | | 45 | | 35 |
| | | b-1 | mass % | 30 | 30 | 30 | | |
| | | b-2 | mass % | | | | 30 | 30 |
| | | c-1 | mass % | 25 | 35 | 25 | 25 | 35 |
| Melt mass flow rate of block copolymer mixture | | | g/10 min | 5.2 | 4.5 | 5.4 | 5.4 | 4.8 |
| Blend formulation of resin composition (block copolymer mixture/polystyrene) | | | mass % (parts by mass) | 80/20 (100/25) | 80/20 (100/25) | 80/20 (100/25) | 80/20 (100/25) | 80/20 (100/25) |
| Various properties of film employing the resin composition | Tensile elongation at break | | % | >200 | >200 | >200 | >200 | >200 |
| | Tensile modulus of elasticity | | MPa | 1,700 | >1,800 | >1,800 | 1,760 | >1,800 |

TABLE 4-continued

| Items | | Unit | Example 1 | Example 2 | Example 3 | Example 4 | Example 5 |
|---|---|---|---|---|---|---|---|
| | Heat shrinkage | % | 75 | 75 | 75 | 75 | 76 |
| | Haze | % | 2.3 | 2.4 | 1.9 | 2.2 | 2.4 |

TABLE 5

| Items | | Unit | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|
| Blend formulation of block copolymer mixture | a-2 | mass % | 35 | 35 | 35 | 35 | | |
| | a-3 | mass % | | | | | 35 | 35 |
| | a-4 | mass % | | | | | | |
| | a-5 | mass % | | | | | | |
| | a-6 | mass % | | | | | | |
| | b-1 | mass % | | | | | 30 | |
| | b-2 | mass % | | | | | | 30 |
| | b-3 | mass % | 30 | | | | | |
| | b-4 | mass % | | 30 | | | | |
| | b-5 | mass % | | | 30 | | | |
| | b-6 | mass % | | | | 30 | | |
| | c-1 | mass % | 35 | 35 | 35 | 35 | 35 | 35 |
| | c-2 | mass % | | | | | | |
| Melt mass flow rate of block copolymer mixture | | g/10 min | 8.6 | 4.5 | 1.2 | 1.4 | 9.4 | 9.6 |
| Blend formulation of resin composition (block copolymer mixture/polystyrene) | | mass % (parts by mass) | 80/20 (100/25) | 80/20 (100/25) | 80/20 (100/25) | 80/20 (100/25) | 80/20 (100/25) | 80/20 (100/25) |
| Various properties of film employing the resin composition | Tensile elongation at break | % | <100 | >200 | >200 | >200 | >200 | >200 |
| | Tensile modulus of elasticity | MPa | >1,800 | 1,790 | >1,800 | <1,500 | 1,780 | 1,800 |
| | Heat shrinkage | % | 74 | 74 | 75 | 72 | 74 | 74 |
| | Haze | % | 1.0 | >5.0 | >5.0 | >5.0 | >5.0 | >5.0 |

| Items | | Unit | Comp. Ex. 7 | Comp. Ex. 8 | Comp. Ex. 9 | Comp. Ex. 10 | Comp. Ex. 11 | Comp. Ex. 12 |
|---|---|---|---|---|---|---|---|---|
| Blend formulation of block copolymer mixture | a-2 | mass % | | | | | | |
| | a-3 | mass % | | | | | | |
| | a-4 | mass % | 35 | | | | | |
| | a-5 | mass % | | 35 | | | | |
| | a-6 | mass % | | | 35 | 35 | | |
| | b-1 | mass % | | | 30 | | 30 | |
| | b-2 | mass % | 30 | 30 | | 30 | | 30 |
| | b-3 | mass % | | | | | | |
| | b-4 | mass % | | | | | | |
| | b-5 | mass % | | | | | | |
| | b-6 | mass % | | | | | | |
| | c-1 | mass % | 35 | 35 | 35 | 35 | | |
| | c-2 | mass % | | | | | 35 | 35 |
| Melt mass flow rate of block copolymer mixture | | g/10 min | 2.5 | 8.8 | <1.0 | <1.0 | 4.2 | 4.5 |
| Blend formulation of resin composition (block copolymer mixture/polystyrene) | | mass % (parts by mass) | 80/20 (100/25) | 80/20 (100/25) | 80/20 (100/25) | 80/20 (100/25) | 80/20 (100/25) | 80/20 (100/25) |
| Various properties of film employing the resin composition | Tensile elongation at break | % | >200 | 114 | >200 | >200 | >200 | >200 |
| | Tensile modulus of elasticity | MPa | <1,500 | >1,800 | >1,800 | >1,800 | <1,500 | <1,500 |
| | Heat shrinkage | % | 73 | 75 | 74 | 75 | 72 | 72 |
| | Haze | % | 4.4 | 1.2 | >5.0 | >5.0 | 3.2 | 3.4 |

| Items | | Unit | Comp. Ex. 13 | Comp. Ex. 14 | Comp. Ex. 15 | Comp. Ex. 16 | Comp. Ex. 17 |
|---|---|---|---|---|---|---|---|
| Blend formulation of block copolymer mixture | a-2 | mass % | 80 | 80 | | | 50 |
| | a-3 | mass % | | | | | |
| | a-4 | mass % | | | | | |
| | a-5 | mass % | | | | | |
| | a-6 | mass % | | | | | |
| | b-1 | mass % | 20 | | 85 | | |
| | b-2 | mass % | | 20 | | 85 | |
| | b-3 | mass % | | | | | |
| | b-4 | mass % | | | | | |

TABLE 5-continued

|  |  |  |  |  |  |  |  |
|---|---|---|---|---|---|---|---|
| | b-5 | mass % | | | | | |
| | b-6 | mass % | | | | | |
| | c-1 | mass % | | | 15 | 15 | 50 |
| | c-2 | mass % | | | | | |
| Melt mass flow rate of block copolymer mixture | | g/10 min | 3.3 | 3.5 | 9.6 | 9.9 | 3.6 |
| Blend formulation of resin composition (block copolymer mixture/polystyrene) | | mass % (parts by mass) | 80/20 (100/25) | 80/20 (100/25) | 80/20 (100/25) | 80/20 (100/25) | 80/20 (100/25) |
| Various properties of film employing the resin composition | Tensile elongation at break | % | 168 | 156 | >200 | >200 | <100 |
| | Tensile modulus of elasticity | MPa | 1,600 | 1,630 | <1,500 | <1,500 | >1,800 |
| | Heat shrinkage | % | <65 | <65 | 70 | 70 | 71 |
| | Haze | % | 1.3 | 1.3 | >5.0 | >5.0 | 1.7 |

INDUSTRIAL APPLICABILITY

A resin composition comprising the block copolymer mixture obtained by the present invention and a styrene resin, provides, when formed into a film, followed by stretching, a heat shrinkable film excellent in the fracture resistance, shrinkability and rigidity and excellent in the balance of physical properties including transparency. Such a heat shrinkable film or heat shrinkable multilayer film is useful as a label for e.g. pet bottles.

What is claimed is:

1. A block copolymer mixture comprising block copolymers (A), (B) and (C):
   (i) from 20 to 60 mass % of a block copolymer (A), which comprises
   as monomer units, from 75 to 95 mass % of a vinyl aromatic hydrocarbon and from 5 to 25 mass % of a conjugated diene,
   wherein the block copolymer (A), at least at one terminal, has a block portion that comprises a vinyl aromatic hydrocarbon having a number average molecular weight ranging from 30,000 to less than 150,000, and
   wherein block copolymer (A) has a number average molecular weight ranging from 100,000 to less than 300,000;
   (ii) from 20 to 70 mass % of a block copolymer (B), which comprises
   as monomer units, from 50 to 80 mass % of a vinyl aromatic hydrocarbon and from 20 to 50 mass % of a conjugated diene,
   wherein the block copolymer (B), at least at one terminal, has a block portion that comprises a vinyl aromatic hydrocarbon having a number average molecular weight ranging from 20,000 to less than 120,000,
   wherein the block copolymer (B) has, from 10 to 70 mass % of at least one random copolymer block portion comprising, as monomer units, from 55 to 95 mass % of a vinyl aromatic hydrocarbon and from 5 to 45 mass % of a conjugated diene and
   wherein the block copolymer (B) further has from 15 to 45 mass % of at least one random (co)polymer block portion comprising, as monomer units, from 0 to less than 55 mass % of a vinyl aromatic hydrocarbon and from greater than 45 to 100 mass % of a conjugated diene, and
   wherein block copolymer (B) has an entire number average molecular weight ranging from 50,000 to less than 200,000;
   (iii) from 5 to 50 mass % of a block copolymer (C), which comprises
   as monomer units, from 60 to 95 mass % of a vinyl aromatic hydrocarbon and from 5 to 40 mass % of a conjugated diene,
   wherein the copolymer has at least one random copolymer block portion comprising, as monomer units, from 55 to 95 mass % of a vinyl aromatic hydrocarbon and from 5 to 45 mass % of a conjugated diene, and
   wherein block copolymer (C) has a number average molecular weight ranging from 200,000 to less than 300,000.

2. The block copolymer mixture according to claim 1, wherein the melt mass flow rate is from 2 to 30 g/10 min.

3. A resin composition comprising 100 parts by mass of the block copolymer mixture as defined in claim 1 and from 5 to 100 parts by mass of a styrene resin.

4. A sheet comprising the resin composition as defined in claim 3.

5. A film comprising the resin composition as defined in claim 3.

6. A heat shrinkable film comprising the resin composition as defined in claim 3.

7. A heat shrinkable multilayer film having at least one heat shrinkable film layer comprising the resin composition as defined in claim 3.

8. A bottle comprising the heat shrinkable film as defined in claim 6.

9. A bottle comprising the heat shrinkable multilayer film as defined in claim 7.

10. The heat shrinkable film according to claim 6, wherein the thickness of the film is from 10 μm to 300 μm.

11. The block copolymer mixture according to claim 1, wherein the vinyl aromatic hydrocarbon is selected from the group consisting of styrene, o-methylstyrene, p-methylstyrene, p-tert-butylstyrene, 1,3-dimethylstyrene, α-methylstyrene, vinylnaphthalene, and vinylanthracene.

12. The block copolymer mixture according to claim 1, wherein the vinyl aromatic hydrocarbon is styrene.

13. The block copolymer mixture according to claim 1, wherein the conjugated diene is selected from the group consisting of 1,3-butadiene, 2-methyl-1,3-butadiene, 2,3-dimethyl-1,3-butadiene, 1,3-pentadiene, and 1,3-hexadiene.

14. The block copolymer mixture according to claim 1, wherein the conjugated diene is 1,3-butadiene.

15. The resin composition according to claim 3, wherein the styrene resin is a polymer selected from the group consisting of a polystyrene, a styrene/α-methylstyrene copolymer, an acrylonitrile/styrene copolymer, a styrene/acrylate copolymer, a styrene/methacrylate copolymer, a styrene/maleic anhydride copolymer and a styrene/butadiene copolymer.

16. The resin composition according to claim 3, wherein the styrene resin is a polystyrene.

17. The resin composition according to claim 3, wherein the styrene resin is a styrene/acrylate copolymer.

18. The resin composition according to claim 3, wherein the styrene resin is a styrene/butadiene copolymer.

19. A resin composition comprising 100 parts by mass of the block copolymer mixture as defined in claim 2 and from 5 to 100 parts by mass of a styrene resin.

20. A sheet comprising the resin composition as defined in claim 19.

21. A film comprising the resin composition as defined in claim 19.

22. A heat shrinkable film comprising the resin composition as defined in claim 19.

23. A heat shrinkable multilayer film having at least one heat shrinkable film layer comprising the resin composition as defined in claim 19.

24. A bottle comprising the heat shrinkable film as defined in claim 22.

25. A bottle comprising the heat shrinkable multilayer film as defined in claim 23.

* * * * *